United States Patent
Jeong

(10) Patent No.: US 8,449,036 B2
(45) Date of Patent: May 28, 2013

(54) HEADREST FOR CARS

(76) Inventor: Hae Il Jeong, Incheon (KR)

( * ) Notice: Subject to any disclaimer, the term of this patent is extended or adjusted under 35 U.S.C. 154(b) by 378 days.

(21) Appl. No.: 12/864,999

(22) PCT Filed: Sep. 23, 2008

(86) PCT No.: PCT/KR2008/005652
§ 371 (c)(1),
(2), (4) Date: Jul. 28, 2010

(87) PCT Pub. No.: WO2009/096648
PCT Pub. Date: Aug. 6, 2009

(65) Prior Publication Data
US 2010/0327645 A1    Dec. 30, 2010

(30) Foreign Application Priority Data

Jan. 30, 2008   (KR) ................ 10-2008-0009750

(51) Int. Cl.
*A47C 7/36* (2006.01)
(52) U.S. Cl.
USPC ........................................... 297/408
(58) Field of Classification Search
USPC ................... 297/408, 391, 216.12
See application file for complete search history.

(56) References Cited

U.S. PATENT DOCUMENTS

| | | | | |
|---|---|---|---|---|
| 6,302,485 | B1* | 10/2001 | Nakane et al. | 297/408 |
| 2007/0170766 | A1* | 7/2007 | Brawner | 297/408 |
| 2007/0236069 | A1* | 10/2007 | Chung | 297/408 |
| 2009/0021068 | A1* | 1/2009 | Yamane et al. | 297/408 |
| 2009/0152924 | A1* | 6/2009 | Kim et al. | 297/408 |
| 2010/0133889 | A1* | 6/2010 | Lutzka et al. | 297/408 |
| 2010/0219670 | A1* | 9/2010 | Jammalamadaka et al. | 297/408 |

FOREIGN PATENT DOCUMENTS

| | | |
|---|---|---|
| JP | 11-262427 | 9/1999 |
| JP | 2000-225036 | 8/2000 |
| JP | 2000-270958 | 10/2000 |
| JP | 2006-015021 | 1/2006 |
| KR | 10-2001-0106597 | 12/2001 |

* cited by examiner

*Primary Examiner* — Milton Nelson, Jr.
(74) *Attorney, Agent, or Firm* — Dilworth & Barrese, LLP

(57) ABSTRACT

The present invention generally relates to a headrest for vehicles, and more particularly to a headrest for cars which may be easily folded manually or electrically, thereby providing other passengers with a wider prospect. A headrest of the present invention comprises a pivotable housing member comprising a pair of housing halves and rotatably coupled to the horizontal portion of the stay rod, a ratchet member fixed to the horizontal portion of the stay rod adjoining the inner side wall of one of the housing halves, a return spring wound around the horizontal portion of the stay rod between the ratchet member and the other of the housing halves, a check member pivotably arranged above the ratchet member to engage with or be disengaged from the ratchet member and keep the upright position of the pivotable housing member when the ratchet member engages with the check member, a check spring for maintaining the engagement of the ratchet member with the check member, a release member for disengaging the check member from the ratchet member.

20 Claims, 10 Drawing Sheets

PRIOR ART

Fig. 12
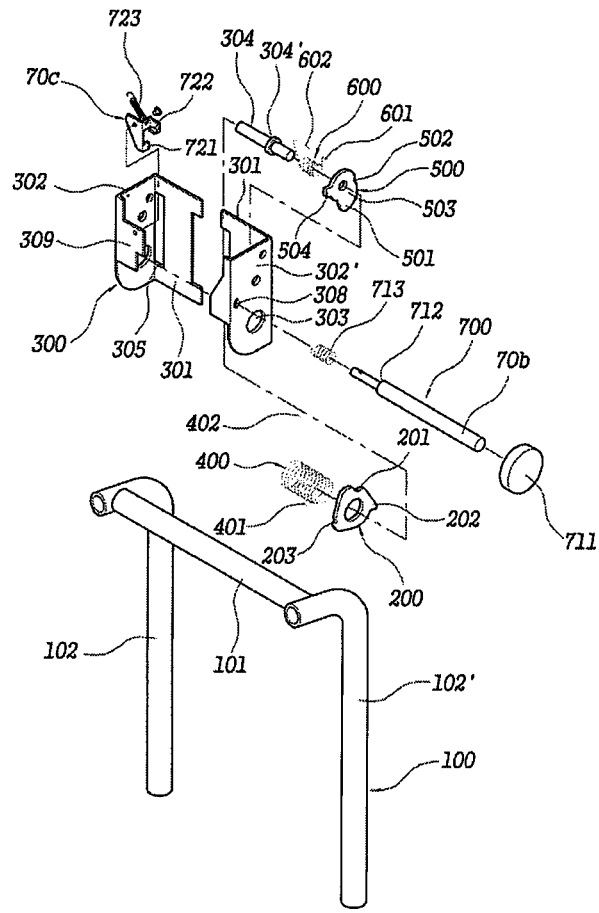
[Fig. 13]
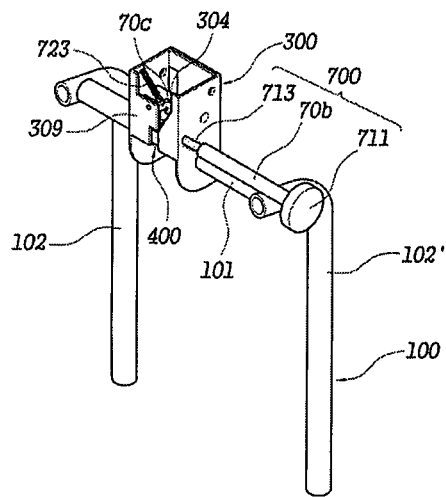

HEADREST FOR CARS

TECHNICAL FIELD

The present invention relates to a headrest for cars or vehicles, and more particularly to a headrest for cars which may be easily folded or stooped manually or electrically, thereby providing other occupants with a wider view or prospect.

BACKGROUND ART

Generally, the headrest for cars, provided on the upper part of the seat back, is used for the occupant of the seat to rest the head on it by adjusting its height up and down and its position forward and backward and protect the neck and head from being injured by preventing them from the abrupt backward movement due to a car accident, particularly a rear-end collision.

There has been a need for foldable headrests, because the upright type headrests can obstruct the driver's view when looking rearward and the view of the rear seat occupants as well.

The U.S. Pat. No. 6,302,485 discloses a foldable headrest device for giving a wide rear field of view to the driver or a passenger seated in the front seat and the headrest device 4 includes a headrest body 1 supported on a frame 3 of the seat back 2 of the vehicles rear seat by virtue of a stay member 5 (see FIG. 1). The headrest body, rotatably supported on horizontal shaft portion 6 of the stay member, is adapted to be selectively moved between two positions, an upright position (i.e., a used position) and a folded position (i.e., a non-used position) and positioned at one of the two positions, as can be seen from FIG. 1.

As shown in FIG. 2, the headrest device 4 comprises a stopper element 8 having a pair of downwardly extending leg portions 9, 10 at the lower portion and laterally stepped stopper portions 11, 12 at the upper portion and secured on the central portion of the horizontal shaft portion 6 of the stay member, a rotating element 14 rotatably supported on the horizontal portion 6 of the stay member through a pair of brackets 15 that are arranged on opposite sides of the stopper element, an operating lever 16 having a locking mechanism in the form of a pair of downwardly extending and separately provided spaced apart locking elements 17, 18, a pair of elongated holes 19, 20 with pins 22 and 23 disposed therethrough and an operating portion 21 and always biased by the force of the spring 24, and an approximately U-shaped torsion bar 25 with the horizontal portion 26 in contact with the front and rear surfaces of the pair of leg portions of the stopper element, a shorter leg portion 27 engaging the spring hanging portion 13 of the stopper element and a longer leg portion 28 slidably supported on the rotating element and applying its spring force to the headrest body to make the rotating element folded to the housed position. The headrest body as described above has a disadvantage of complicated structures of the stopper element, the rotating element and the operating element as well as the complexity of assembling them on the stay member, making the manufacturing and assembling thereof very difficult and troublesome.

The above problems lead to poor productivity and quality of the device, while the largeness of the elements resulted in waste of materials, increasing the manufacturing costs as well as the size and weight of the device.

DISCLOSURE OF INVENTION

Technical Problem

One of the objects of the present invention, aimed to solve the above problems, is to provide a light weight headrest device for cars of which manufacturing and assemblying of the key elements are easy and simple.

Another object of the present invention is to provide a headrest device for cars which is made with a high productivity, a low manufacturing cost and reduced defective products.

Still another object of the present invention is to provide a headrest device, the headrest body of which in the upright position can maintain the upright state against a strong forward or backward impact on it.

Technical Solution

In order to achieve the above objects, the present invention provides a headrest for cars, comprising a pivotable housing member comprising a pair of housing halves and pivotably engaged with the horizontal portion of a stay rod, a ratchet member provided with a notch or groove, disposed near the inner side wall of one of the housing halves of the housing member and fixed to the horizontal portion of the stay rod, a return spring wound around the horizontal portion of the stay rod between the ratchet member and the other of the housing halves and biasing the housing member in the forward direction by its spring force, a check member provided with a projection for engaging with the notch or groove of the ratchet member, pivotably arranged above the ratchet member to engage with or be disengaged from the ratchet member and operating to retain the upright position of the housing member through engagement with the ratchet member and allow the housing member to be folded with the spring force of the return spring through disengagement from the ratchet member, a check spring for maintaining the engagement of the check member with the ratchet member, and a release member for disengaging the check member from the ratchet member.

Advantageous Effects

As described above, the present invention provides a headrest for cars with a very simple structure, making it easy and simple to manufacture and assemble elements of the device with the improved productivity and the reduced production costs.

Further, small sizes of the elements contribute to achieving lighter and compact headrest for cars, and the strongly maintained upright position of the headrest body can effectively protect the neck of the occupant of the seat or the passenger from being injured at the time of car accidents such as a rear-end collision.

BRIEF DESCRIPTION OF THE DRAWINGS

The present invention will now be described in more detail for the preferred embodiments thereof with reference to the accompanying drawings in which:

FIG. 12 is an exploded perspective view of a headrest for cars according to a second embodiment of the present invention;

FIG. 13 is a perspective view of the headrest of FIG. 12;

MODE FOR THE INVENTION

Figure 1:
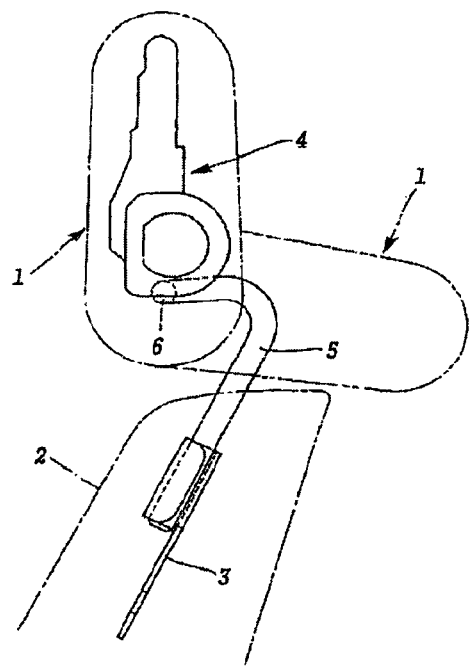
FIG. 1 is a side view of a headrest device for cars of prior art.
Figure 2:
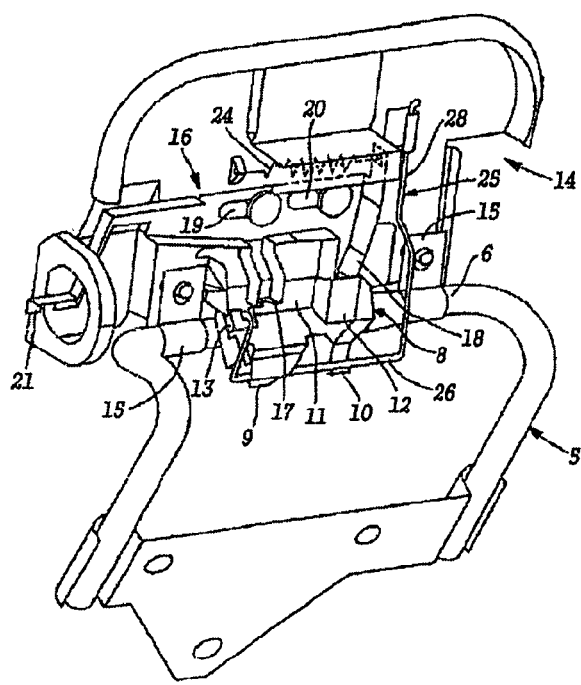
FIG. 2 is a perspective view of the headrest device of FIG. 1.
Figure 3:
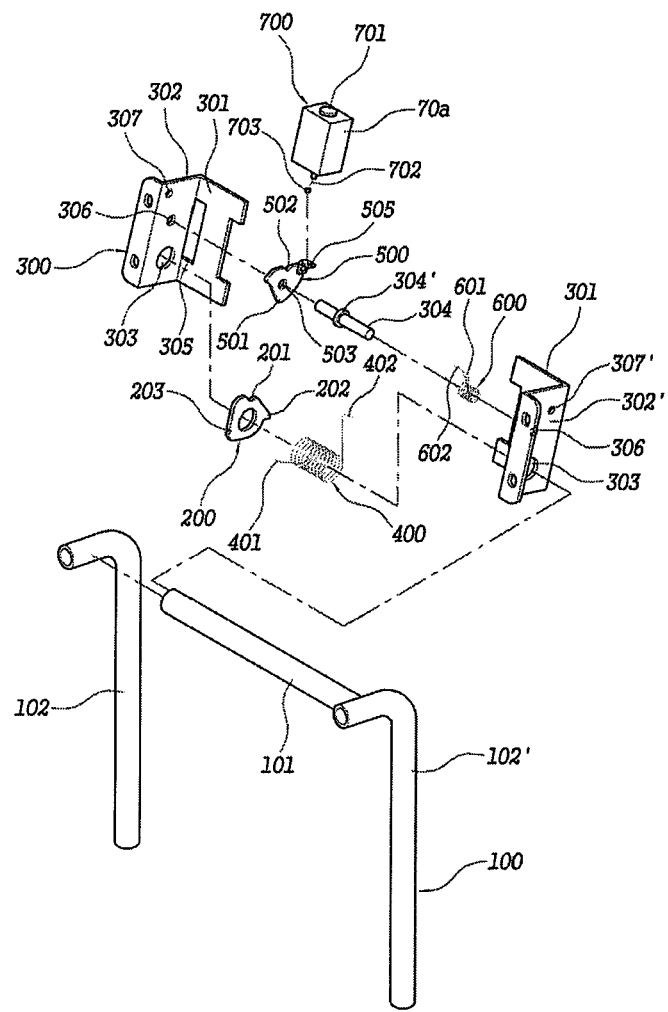
FIG. 3 is an exploded perspective view of a headrest for cars according to a first embodiment of the present invention.
Figure 4:
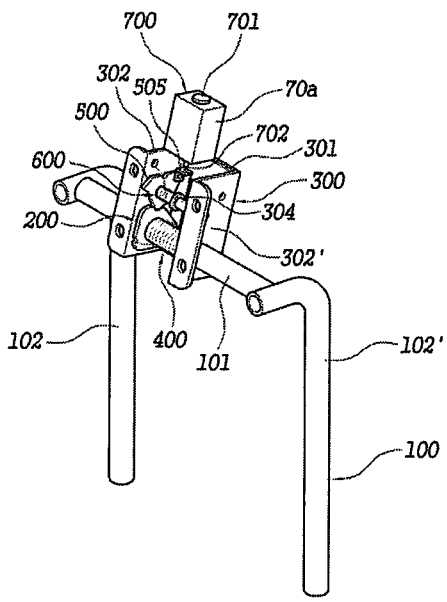
FIG. 4 is a perspective view of the headrest of FIG. 3.

Referring to FIGS. 3 through 7, a headrest for cars according to a first embodiment of the present invention comprises a stay rod 100 having a horizontal portion 101 and a pair of leg portions 102, 102', a pivotable housing member 300 having a pair of housing halves 302, 302' and rotatably coupled on the horizontal portion 101 of the stay rod 100, a ratchet member 200 provided with a notch or groove, disposed near the inner side wall of one of the housing halves 302 and fixed to the horizontal portion 101 of the stay rod 100, a return spring 400 arranged between the ratchet member 200 and the inner side wall of the other of the housing halves 302' and wound around the horizontal portion 101 of the stay rod 100 with opposite ends hooked on the ratchet member and the pivotable housing member, respectively, thereby biasing the housing member in the backward direction for being stooped or folded down, a check member 500 pivotably supported on a shaft 304 fixed between the opposite housing halves 302, 302' and above the ratchet member to engage with or be disengaged from the ratchet member for sustaining the housing member in the upright position by either keeping its engagement with the ratchet member or allowing it to be folded down by the force of the return spring with disengagement of the check member from the ratchet member by an external force, a check spring 600 wound around the shaft 304 with the opposite ends hung on the check member and the housing member respectively, thereby exerting its force to maintain the engagement of the check member with the ratchet member, and a release member coupled to the check member for releasing the check member's engagement with the ratchet member.

The stay rod 100 is made by welding three metal pipes together, or may be made by welding two metal bars and a metal pipe together or bending a steel bar to have the horizontal portion and two leg portions, while the ratchet member 200 is desirably fixed to the horizontal portion through its center hole before welding the horizontal portion and the leg portions together.

The ratchet member 200 is made to have a notch 201 at the top portion, a jaw 202 at one side and a groove at the other side for hanging one end of the return spring therein.

The jaw 202 of the ratchet member 200 engages a step 305 formed in the rear wall portion 301 of either of the housing halves 302, 302' and prevents the housing member 300 from being pivoted or folded down in the clockwise direction or to the right in the drawing, even if an external force in the same direction is applied to the housing member 300, when the housing member is in the upright position, as described hereinafter. The rear wall portion 301 of the housing member 300 formed with the step 305 may be replaced by a connection between the parallel housing halves 302, 302', formed with a same or similar step, or an equivalent thereof including a hole in which the jaw of the ratchet member may be received or inserted for resting.

The pivotable housing member 300 is made by combining a pair of housing halves 302, 302' having their respective rear wall portions 301, 301 riveted or welded at their overlapped opposing side edges, after one end of a shaft 304 carrying a check member 500 and a check spring 600 side by side thereon is fixed in a shaft hole 306 on the upper part of the side wall of one housing half 302, which is pivotably coupled with the horizontal portion 101 of the stay rod 100 through its lower shaft hole 303 and the inner side wall of which adjoins the ratchet member 200 carried by the horizontal portion 101 of the stay rod near one end thereof, the other end of the horizontal portion 101 of the stay rod 100 having a return spring 400 wound around it next to the ratchet member 200, and the opposing side edges of the rear wall portions 301, 301 of the two housing halves 302, 302' are overlapped and the other end of the shaft 304 is inserted and fixed in the shaft hole 306 of the other housing half 302'.

The opposite ends of the horizontal portion 101 of the stay rod 100 and the upper ends of the leg portions 102, 102' of the stay rod 100 are then welded together in the case of making the stay rod 100 having at least one metal pipe leg portion 102 or 102'. One end 601 of the check spring 600 is hung on the groove 502 of the check member 500 and the other end 602 thereof on the hole 307 of one housing half 302, while one end 401 of the return spring 400 is hooked on the groove 203 and the other end 402 thereof on the hole 307' of the other housing half 302'. The solenoid 70a, used as a release member 700 in this embodiment, is provided with an operating pin 701 and a wire 702 having a puller 703 at the end and connected to the front end of the operating pin 701, disposed above the check member 500 having a projection 501 at the underbody, a groove 502 on the upside and a pivoting handle piece 505 at the upper rear corner. The puller 703 of the wire 702 of the solenoid 70a engages with the pivoting handle piece 505 of the check member 500 for pulling it up and thereby allowing the check member 500 to be pivoted against the influence of the spring force of the check spring 600 and be disengaged from the ratchet member 200.

The end part of the wire 702 is preferably in the shape of a ball in a loose-fitting ring so that the wire 702 may not go awry regardless of the direction of pivoting of the check member 500, the pivoting handle piece 505 of which is connected to the operating pin 701 via the wire 702.

Further, the pivoting handle piece 505 as shown in the drawings may be replaced by any appropriate element such as a hole formed at the upper rear corner of the check member 500, or may be modified to match the release member.

The above described process of fabricating or assembling of the members or elements is given as an example thereof, but not limited thereto, and other processes or steps may be adopted for coupling the ratchet member 200, the housing member 300 and the return spring 400 to the horizontal portion 101 of the stay rod 100.

The return spring 400 as a coil spring, disposed between the ratchet member 200 and the other housing half 302' of the housing member 300, functions to prevent the housing member 300 from moving to and fro on the horizontal portion 101 of the stay rod 100.

The checking projection 501 at the underbody of the check member 500 engages with and fit in the notch 201 of the ratchet member 200 so that the housing member 300 may take and maintain the upright position regardless of the spring force exerted in the clockwise direction of the check spring 600, one end 601 of which is hung on the groove 502 of the check member 500 and the return spring 400, the other end 402 of which is hung on the hole 307' of the other housing half 302'. The housing member 300 may be folded rearward, only when the check projection 501 of the check member 500 is disengaged from the checking notch 201 of the ratchet member 200 as described hereinafter.

The check spring 600, as a coil spring, applies the spring force to the check member 500, biasing it in the clockwise direction with one end 601 hung on the groove 502 formed at the rear part of the top of the check member 500 and the other end 602 on the hole 307 formed at the upper part of the side wall of one of the housing halves 302 of the housing member 300.

In the upright position of the housing member 300, the biasing force of the check spring 600 in the clockwise direction can not make the check member 500 to be pivoted in the clockwise direction, as the projection 501 of the check member 500 is held in the groove 201 of the ratchet member 200, which is fixed to the horizontal portion of the stay rod and thus, can not pivot or move in any direction. When the check member 500 is pivoted in the counter-clockwise direction by an external force with its check projection 501 disengaged from the check notch 201 of the ratchet member, the resilient force of the return spring urges the housing member 300 and the headrest body 1 in the rearward direction, making both of them folded down.

In other words, firm engagement of the ratchet member and the check member maintains the upright position of the housing member 300 against the spring force of the return spring 400 biasing the housing member 300 in the rearward direction.

The check spring 600, a coil spring having a length relative to the distance or gap between the check member 500 and the inner wall of the other housing half 302', also operates to push the check member 500 towards the inner wall of one of the housing halves 302 and makes it to maintain the position for the check projection's engaging with or being disengaged from the checking notch.

The length of the check spring 600 may be shortened by forming an annular projection 304' on the shaft 304 at the part next to the check member 500 and disposing the spring between the projection 304' and the inner wall of the other of the housing halves 302'.

The electric wire for connecting the solenoid 70a as the release member 700 to the power supply of the car may be extended through the hollow in one of the pipe leg portions and inside the seat back.

In order to make the headrest device of the above described embodiment of the present invention folded down, the driver or an occupant of the car seat turns on a switch (not shown) for activating the solenoid 70a, making the operating pin 701 to be raised and the wire 702 to pull up the upper corner of the check member 500 by means of the pivoting handle piece 505. Thus, the check member 500 is pivoted in the counter-clockwise direction and the check projection 501 thereof is disengaged from the checking notch 201 of the ratchet member 200, allowing the return spring 400 to make the housing member 300 to be pivoted in the clockwise or rearward direction (see FIG. 6) until it is folded down to the traverse position with the lower inner part of the rear wall portions 301 thereof contacting the lower surface of the ratchet member 200.

Figure 5:
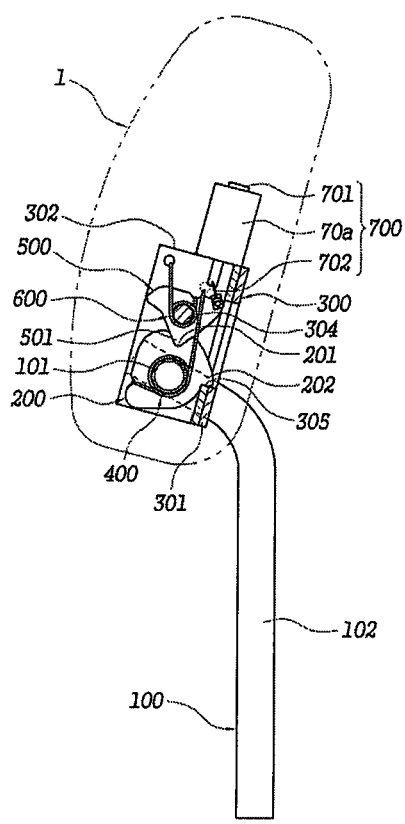
FIGS. 5 to 7 are side sections illustrating the operation of the headrest of FIGS. 3 and 4.
Figure 6:
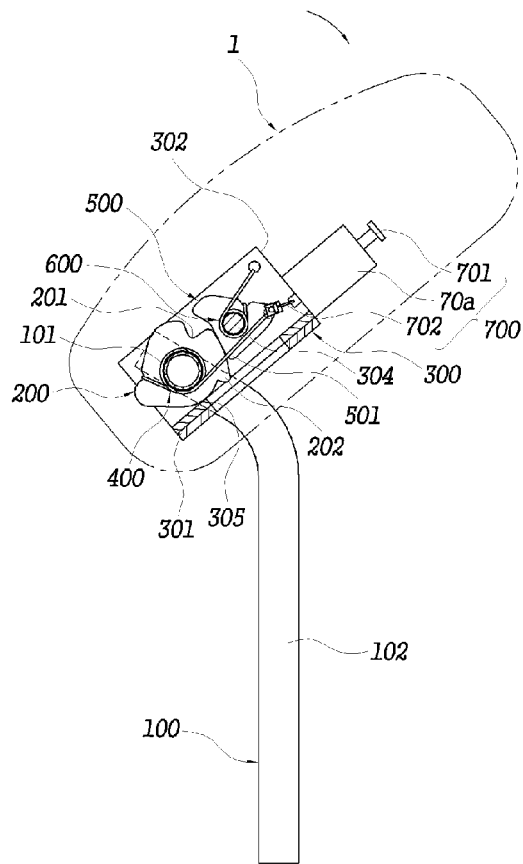
Figure 7:
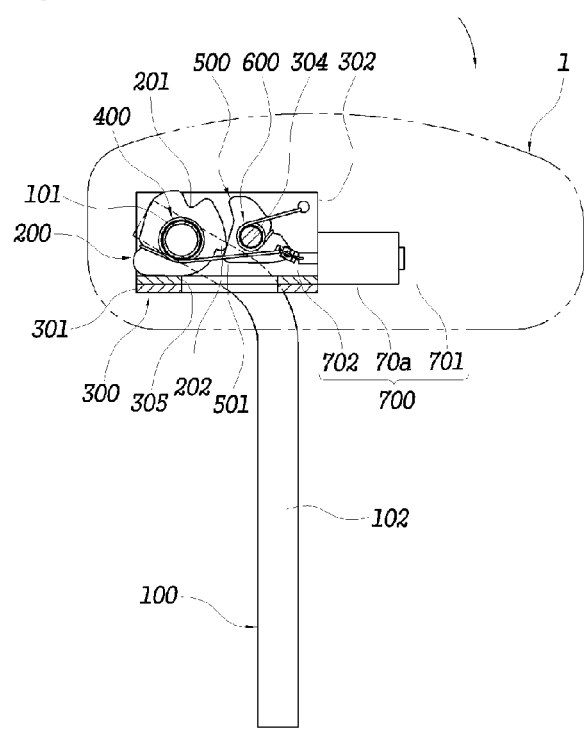
Figure 8:
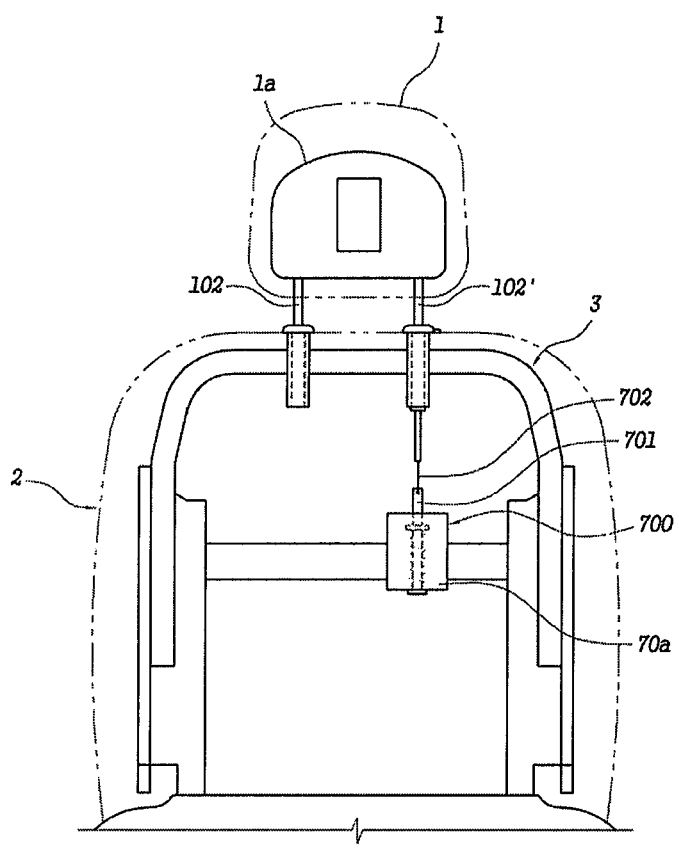
FIG. 8 a schematic view of a modification of the headrest according to the first embodiment of the present invention mounted on the seat back of a car.
Figure 9:
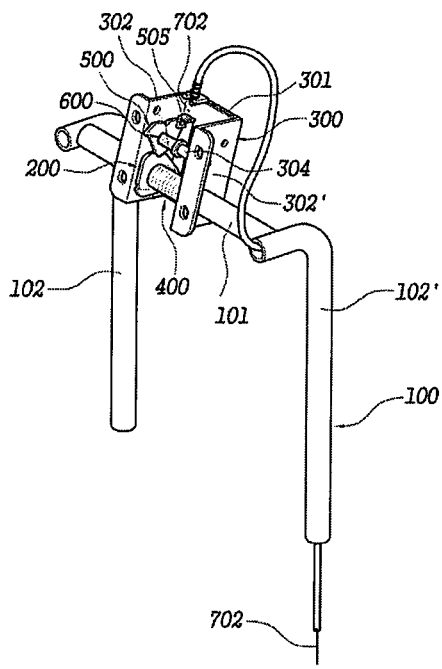
FIG. 9 is a perspective view of the headrest of FIG. 8.

The solenoid 70a is then deactivated as the switch is turned off and lowers the operating pin 701 to the previous position, allowing the front end of the wire 702 under the operating pin 701 to be lowered below the pivoting handle piece 505 as shown in FIG. 7. The front end of the wire 702 will be raised to meet the pivoting handle piece 505 and be ready for the next operation, as the housing member 300 is forced to take the upright position as shown in FIG. 5 by the driver or a passenger.

The fore part of the check projection 501 of the check member 500 travels along the rear part of the ratchet member 200, when the housing member 300 is forced to be pivoted, which makes the check projection 501 of the check member 500 to be easily and correctly fitted in the checking notch 201 of the ratchet member 200, whenever the housing member 300 is made to be pivoted in the counter-clockwise or forward direction for taking the upright position.

In the upright position, the housing member 300 is not forwardly pivoted even by a forward force but kept in that position, as the jaw 202 at the rear part of the ratchet member 200, fixedly supported on the horizontal portion of the stay rod, firmly engages the step 305 in its rear wall portion 301 with the aid of the clockwise resilient force of the return spring 400, keeping the ratchet member 200 in the fixed position, the groove 201 of which holds or catches the check projection 201 of the check member 200 therein and thereby preventing the housing member from being forwardly pivoted.

Resultantly, as described above, the headrest for cars according to the first embodiment of the present invention in the upright position can protect the neck and head of the occupant of the car seat from being injured against the impact caused by car accidents, particularly rear-end collisions.

With reference to FIGS. 8 through 11, a modification of the headrest of the first embodiment of the present invention will be hereinafter described in detail.

The headrest of FIGS. 8 through 11 is characterized in that the solenoid 70a is fixed to a part of the frame 3 of the seat back 2 and the front end of the operating pin 701 of the solenoid 70a and the pivoting handle piece 505 of the check member 500 is connected by a wire 702 distributed through a plastic tube extending through the inner enclosure 1a of the headrest body 1, one of the pipe leg portions 102 and inside of the seat back, while other structures thereof are the same as those of the headrest of FIGS. 3 through 7.

Figure 10:
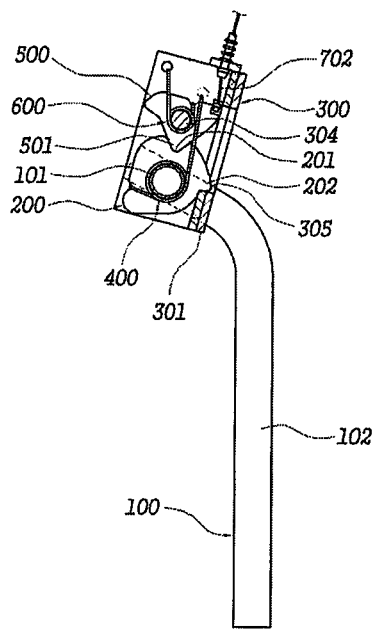
FIGS. 10 and 11 are side sections showing the operation of the headrest of FIGS. 8 and 9.
Figure 11:
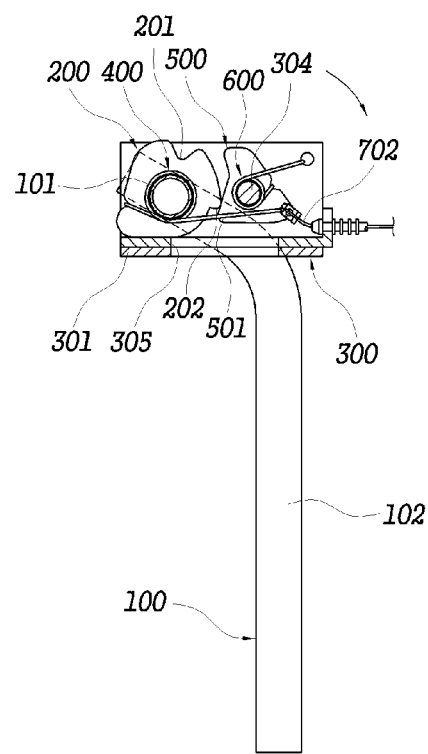

This headrest in the upright position as shown in FIG. 10 can be folded down rearwardly, as the operating pin 701 of the solenoid 70a is lowered by the latter's activation by a switch, thereby pulling up the upper rear corner of the check member 500 and causing it to be pivoted in the same manner as described for the headrest of FIGS. 3 through 7. Except the above, the operation and the functions of the headrest of FIGS. 8 through 11 are the same as the headrest of FIGS. 3 through 7 and will be not described in detail for clarity.

Referring to FIGS. 12 through 17, the headrest for cars according to a second embodiment of the present invention is characterized in that the solenoid 70a as the release member 700 is replaced by a combination of a release rod 70b and an interlocking member 70c, while other structures thereof are the same as the headrest according to the first embodiment of the present invention.

In this embodiment, a release rod 70b as a release member 700 is provided with a small diameter part and an adjoining large diameter part with a step 712 therebetween, while an interlocking member 70c is made to have an interlocking piece 721 at the lower part of one side and a push piece at the upper part of the other side. The interlocking member 70c is pivotably coupled to the inner surface of the front wall portion 309 of one of a pair of the housing halves 302 and the small diameter part of the release rod 70b with a coil spring 713 wound around it is movably inserted through a hole 308 formed on the other of a pair of the housing halves 302' so that the front end of the release rod 70b may be positioned to face the interlocking piece 721 and the push piece 722 thereof may be placed on or above the pivoting starter jaw 504 protruded on the left upper corner of the check member 500.

The spring 713 functions to push the release rod 70b outwardly, while a pulling spring 723 is fixed between the upper part of the interlocking member 70c and the upper portion of one housing half 302, biasing the interlocking member 70c to be pivoted in the counter-clockwise direction.

Figure 14:
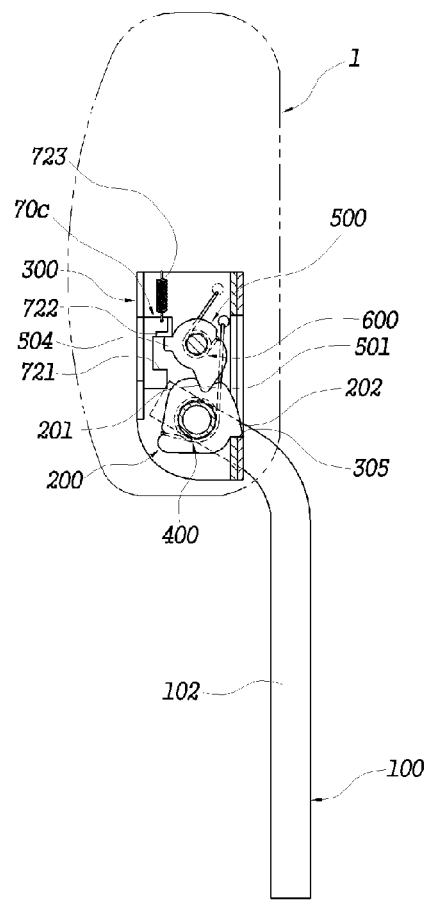
FIGS. 14 and 15 are side sections showing the operation of the headrest of FIGS. 12 and 13; and, FIGS. 16 and 17 are front views with partial section depicting the operation of the headrest of FIGS. 12 and 13.
Figure 15:
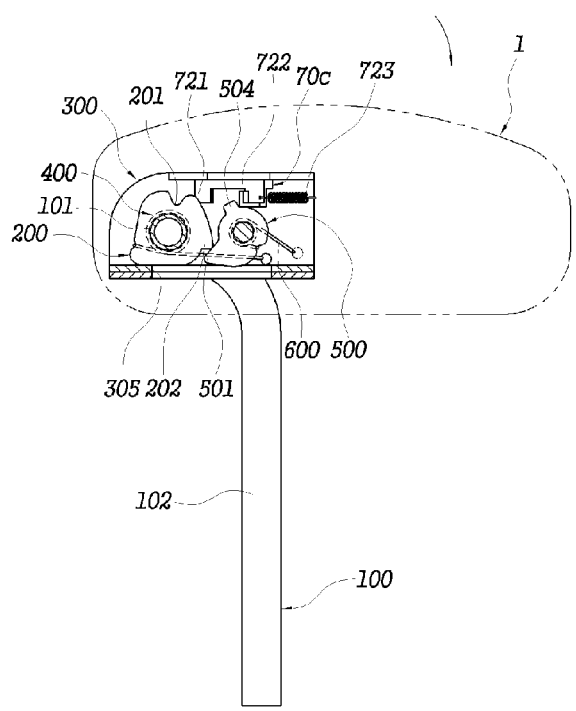

As can be seen from FIGS. 14 and 15, the headrest body 1 of this embodiment takes and maintains the upright position in the same manner as in the headrest of the first embodiment as described above.

Figure 16:
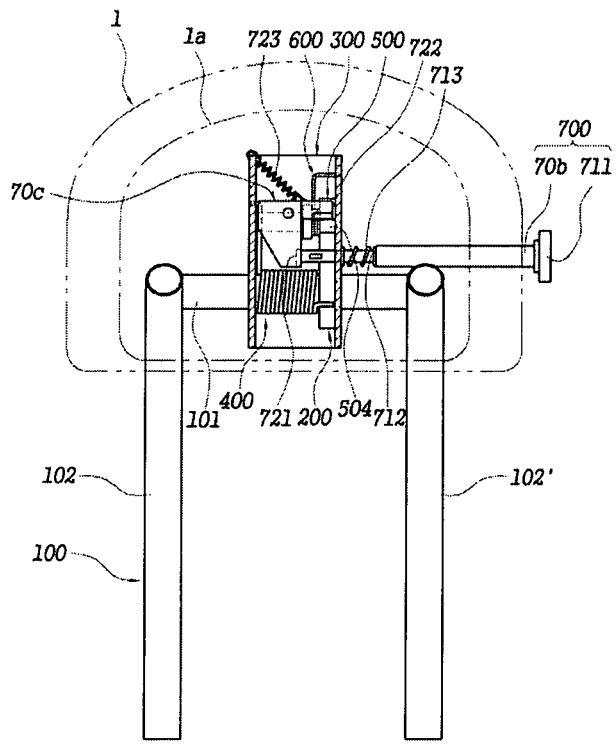
Figure 17:
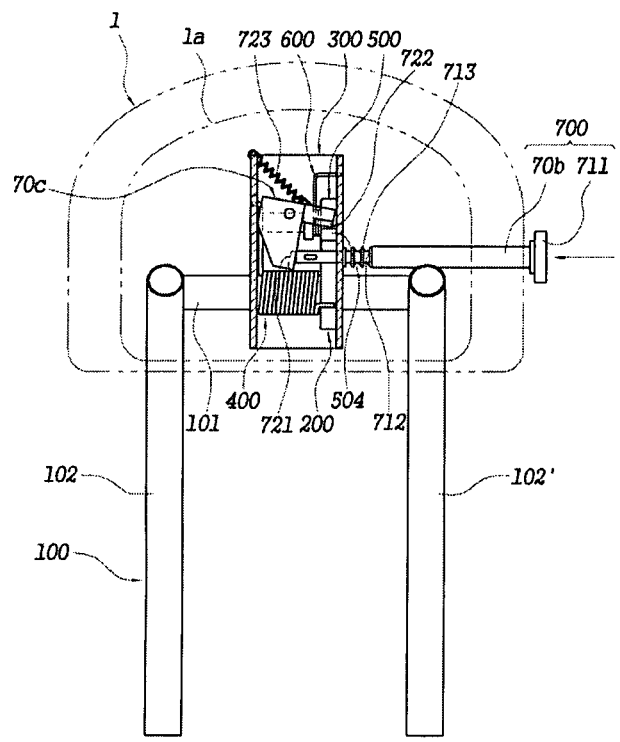

Referring to FIGS. 16 and 17, the headrest body 1 is folded down by making the check member 500 to be pivoted and thus, disengaging its check protrusion 501 from the checking notch 201. Specifically, the release rod 70b provided with a knob 711 at the outer end and outwardly extended through the headrest body 1 having its inner enclosure 1a (see FIG. 16) is pushed toward the housing member 300 with the front end thereof pushing the interlocking piece 721 of the interlocking member 70c, thereby making the member to be pivoted in the clockwise direction and the push piece 722 thereof to be lowered (see FIG. 17).

The lowering push piece 722 pulls down the pivoting starter jaw 504 of the check member 500 and makes the member to be pivoted from its position as shown in FIG. 14 in the counter-clockwise direction, causing the check projection 501 thereof to be disengaged from the checking groove 201 of the check member 200 and allowing the housing member 300 and the headrest body 1 to be pivoted and folded down rearwardly at the influence of the spring force of the return spring 400 in the same manner as in the headrest device of the first embodiment.

The release rod 70b and the front end thereof are returned to their previous positions as shown in FIG. 16, allowing the interlocking member 70c to be pivoted in the counter-clockwise direction by the force of the pulling spring 723, when the force pushing the rod toward the headrest body with the knob 711 is removed.

As described above, in the second embodiment of the present invention, the housing member 300 and the headrest body 1 are folded down from their upright position, as the release rod 70b makes the interlocking member 70c and the check member 500 to be pivoted successively, thereby leading to disengagement of the check member and the ratchet member.

Meanwhile, the pivot starter pieces of the check members and the corresponding parts of the release members in the first and second embodiments can be modified to others with the same operating mechanism, while the springs may be hung or hooked in the ways other than disclosed hereinbefore with the same functions maintained.

Although the present invention has been described by way of example in connection with the preferred embodiments, it is intended that modifications, variations or changes are possible to the person with the ordinary skill in the art without departing from the teaching and ideas of the present invention and the scope of the present invention is not limited to the embodiments of the present invention and the related descriptions, but shall be limited only by the appended claims.

Industrial Applicability

As described above, the present invention can provide a headrest for cars with a simple structure and a correspondingly reduced cost, thereby making it possible to supply headrests for cars at a reasonable price and thereby contributing to development of the related industries.

The invention claimed is:

1. A headrest for cars comprising a stay rod having a horizontal portion and a pair of leg portions downwardly extending from the opposite ends of the horizontal portion, a pivotable housing member having a pair of parallel housing halves connected and fixed to each other at a rear side and rotatably coupled to the horizontal portion of said stay rod, a ratchet member provided with a check groove or notch and fixed to the horizontal portion of said stay rod adjoining the inner side wall of one of the housing halves, a return spring wound around the horizontal portion of the stay rod between said ratchet member and the other of the housing halves, a check member pivotably arranged on a shaft and above said ratchet member and provided with a checking projection to engage with or be disengaged from the check groove of said ratchet member and keep an upright position of said housing member when said ratchet member engages with said check member, a check spring for maintaining the engagement of said ratchet member with said check member, a release member coupled to said check member for disengaging the checking projection of said check member from the check groove of said ratchet member.

2. The headrest for cars of claim 1, wherein said check spring is a coil spring disposed by being wound around the part of said shaft between said ratchet member and the other of the two housing halves of said housing member.

3. The headrest for cars of claim 1, wherein the notch of said ratchet member is provided at the top portion thereof and the checking projection of said check member is formed at the underbody thereof.

4. The headrest for cars of claim 1, wherein a jaw is provided at one side of said ratchet member to engage a step formed at a rear connection between the two housing halves of said housing member, when said housing member is in the upright position.

5. The headrest for cars of claim 1, wherein said return spring is a coil spring disposed by being wound around the part of the horizontal portion of said stay rod between said ratchet member and the other of the two housing halves of said housing member.

6. The headrest for cars of claim 1, wherein said check member is provided with a pivoting starter piece which is actuated by said release member.

7. The headrest for cars of claim 6, wherein said pivoting starter piece is a pivoting handle piece formed at an upper part of said check member and said release member is a solenoid formed with a puller on a front end of a wire carried by an operating pin, wherein the puller is coupled with the pivoting handle piece.

8. The headrest for cars of claim 6, wherein said pivoting starter piece is a jaw protruded on an upper part of said check member and said release member comprises a pivotable interlocking member and a release rod, said interlocking member having an interlocking piece and a push piece and disposed on one of the two housing halves of said housing member diagonally above the check member with the push piece on or above the jaw of said check member and said release rod disposed through the other of the two housing halves of said housing member so that its front end may be pressed against the interlocking piece of said interlocking member and thus make said interlocking member and said check member pivoted successively.

9. The headrest for cars of claim 8, wherein said check spring is a coil spring disposed by being wound around said shaft between a protrusion formed thereon apart from one of the two housing halves of said housing member and said check member.

10. The headrest for cars of claim 8, wherein a spring is provided to bias said interlocking member in the counter-clockwise direction.

11. The headrest for cars of claim 8, wherein said release rod is resiliently disposed through a hole on the other of the two housing halves of said housing member with a coil spring wound around a part inside or outside thereof.

12. The headrest for cars of claim 11, wherein a spring is provided to bias said interlocking member in the counterclockwise direction.

13. A headrest for cars comprising a stay rod having a horizontal portion and a pair of leg portions downwardly extending from the opposite ends of the horizontal portion, a pivotable housing member having a pair of parallel housing halves connected and fixed to each other at a rear side and rotatably coupled to the horizontal portion of said stay rod, a ratchet member provided with a check groove or notch and fixed to the horizontal portion of said stay rod adjoining the inner side wall of one of the housing halves, a return spring wound around the horizontal portion of the stay rod between said ratchet member and the other of the housing halves, a check member pivotably arranged on a shaft and above said ratchet member and provided with a checking projection to engage with or be disengaged from the check groove of said ratchet member and keep an upright position of said housing member when said ratchet member engages with said check member and a pivoting starter piece, a check spring for maintaining the engagement of said ratchet member with said check member, a release member coupled to the pivoting starter piece, said check member for disengaging the checking projection of said check member from the check groove of said ratchet member.

14. The headrest for cars of claim 13, wherein the notch of said ratchet member is provided at the top portion thereof and the checking projection of said check member is formed at the underbody thereof.

15. The headrest for cars of claim 13, wherein a jaw is provided at one side of said ratchet member to engage a step formed at a rear connection between the two housing halves of said housing member, when said housing member is in the upright position.

16. The headrest for cars of claim 13, wherein said return spring is a coil spring disposed by being wound around the part of the horizontal portion of said stay rod between said ratchet member and the other of the two housing halves of said housing member.

17. The headrest for cars of claim 13, wherein said check spring is a coil spring disposed by being wound around the part of said shaft between said ratchet member and the other of the two housing halves of said housing member.

18. The headrest for cars of claim 13, wherein said pivoting starter piece is a pivoting handle piece formed at an upper part of said check member and said release member is a solenoid formed with a puller on a front end of a wire carried by an operating pin, wherein the puller is coupled with the pivoting handle piece.

19. The headrest for cars of claim 13, wherein said pivoting starter piece is a jaw protruded on an upper part of said check member and said release member comprises a pivotable interlocking member and a release rod, said interlocking member having an interlocking piece and a push piece and disposed on one of the two housing halves of said housing member diagonally above the check member with the push piece on or above the jaw of said check member and said release rod disposed through the other of the two housing halves of said housing member so that its front end may be pressed against the interlocking piece of said interlocking member and thus make said interlocking member and said check member pivoted successively.

20. The headrest for cars of claim 19, wherein said check spring is a coil spring disposed by being wound around said shaft between a protrusion formed thereon apart from one of the two housing halves of said housing member and said check member.

* * * * *